United States Patent [19]
Li et al.

[11] Patent Number: 6,130,004
[45] Date of Patent: Oct. 10, 2000

[54] ELECTRODE MATERIALS AND ELECTROCHEMICAL DEVICES USING SAME

[75] Inventors: Changming Li, Vernon Hills; Joseph G. Kincs, Arlington Heights; Lijun Bai, Vernon Hills, all of Ill.

[73] Assignee: Motorola, Inc., Schaumburg, Ill.

[21] Appl. No.: 08/978,472

[22] Filed: Nov. 25, 1997

Related U.S. Application Data

[63] Continuation of application No. PCT/US95/15479, Nov. 29, 1995, which is a continuation-in-part of application No. 08/358,294, Dec. 19, 1994, abandoned.

[51] Int. Cl.$^7$ ..................................... H01M 4/58
[52] U.S. Cl. ................. 429/218.1; 429/219; 429/220; 429/222; 429/223; 429/224; 429/225; 429/229; 429/231.5; 429/231.8; 429/231.95
[58] Field of Search ................. 429/218.1, 219, 429/220, 222, 223, 224, 225, 226, 229, 231.5, 231.8, 231.95

[56] References Cited

U.S. PATENT DOCUMENTS

| | | | |
|---|---|---|---|
| 4,508,639 | 4/1985 | Camps et al. | 252/500 |
| 4,605,482 | 8/1986 | Shiragami et al. | 204/258 |
| 4,948,423 | 8/1990 | Fetcenko et al. | 75/10.14 |
| 4,950,560 | 8/1990 | Tarcy | 429/27 |
| 5,168,020 | 12/1992 | Jow | 429/194 |
| 5,190,695 | 3/1993 | Sotomura | 252/500 |
| 5,268,084 | 12/1993 | McCoy et al. | 204/290 R |
| 5,429,895 | 7/1995 | Lian et al. | 429/223 |
| 5,600,535 | 2/1997 | Jow | 361/503 |
| 5,770,333 | 6/1998 | Saito et al. | 429/194 |
| 5,869,208 | 2/1999 | Miyasaka | 429/224 |

FOREIGN PATENT DOCUMENTS

| | | |
|---|---|---|
| 591606 | 4/1994 | European Pat. Off. |
| 62-211861 | 9/1987 | Japan |
| 3-233859 | 10/1991 | Japan |
| WO 96/19839 | 6/1996 | WIPO |

OTHER PUBLICATIONS

Second International Seminar on Double Layer Capacitors and Similar Energy Storage Devices—Dec. 7–9, 1992—Florida Educational Seminars, Inc. vol. 2 (Seminar and Workshop).

*Primary Examiner*—Laura Werner
*Attorney, Agent, or Firm*—Felipe J. Farley; Philip H. Borrus, IV

[57] ABSTRACT

A material for use as an electrode, and particularly the anode (20) of an electrochemical device, such as an electrochemical capacitor device (10). The material is a multicomponent alloy material, including a host matrix material consisting of antimony, and at least one modifier element selected from the group consisting of bismuth, nickel, cadmium, zinc, silver, manganese, lead, lithium, and combinations thereof.

8 Claims, 5 Drawing Sheets

ELECTRODE MATERIALS AND ELECTROCHEMICAL DEVICES USING SAME

CROSS REFERENCE TO RELATED APPLICATIONS

This is a national stage application of PCT/US95/15479, filed on Nov. 29, 1995, which is a continuation-in-part of U.S. application Ser. No. 08/358,294, filed Dec. 19, 1994, by Changing Li, Joseph G. Kincs, and Lijun Bai entitled "ELECTRODE MATERIALS AND ELECTROCHEMICAL DEVICES USING SAME,", and assigned to Motorola, Inc.

TECHNICAL FIELD

This invention relates in general to the field of electrochemical devices, and more particularly to materials which may be employed as electrodes therein.

BACKGROUND

Electrochemical capacitors are a class of high-rate energy storage/discharge devices which use electrolytes and electrodes of various kinds in a system similar to that of conventional batteries. Electrochemical capacitors, like batteries, are essentially energy storage devices. However, unlike batteries, they rely on charge accumulation at the electrode/electrolyte interface to store energy. Charge storage in electrochemical capacitors therefore is a surface phenomenon. Conversely, charge storage in batteries is a bulk phenomenon occurring within the bulk of the electrode material.

Electrochemical capacitors can generally be divided into two subcategories: Double layer capacitors in which the interfacial capacitance at the electrode/electrolyte interface can be modeled as two parallel sheets of charge; and pseudocapacitor devices in which charge transfer between the electrolyte and the electrode occurs over a wide potential range. These charge transfers are the result of primary, secondary, and tertiary oxidation/reduction reactions between the electrode and the electrolyte. These types of electrochemical capacitors are being developed for high-pulse power applications.

Many known electrochemical capacitor active materials are based on noble metal elements such as ruthenium and iridium. These materials are generally quite expensive. Material expense thus poses a significant hurdle to the wide-spread commercialization of this technology. Other less expensive materials have been tried, but have been less than successful. For example, workers in the field have attempted to fabricated devices using pressed powder cobalt and cobalt oxide electrodes. However, these types of electrodes have failed for numerous reasons including, for example, poor life cycle performance, and inability to achieve desired electrochemical performance characteristics.

Moreover, most of the effort to date has been directed towards developing newer, and better materials for the cathode of electrochemical devices. To date, however, there has been little development of new materials adapted for use as the anode in electrochemical devices. The lack of new anode materials has been a principle reason for the inability of these devices to meet market demands for power density, size, cost, and cycle.

Accordingly, there exists a need for electrochemical electrode materials which deliver good performance in terms of energy storage, power density, and cycle life. Moreover, such materials should be abundant in nature, inexpensive in cost, readily processable into devices, and relatively benign environmentally.

DETAILED DESCRIPTION OF THE PREFERRED EMBODIMENT

Figure 1:
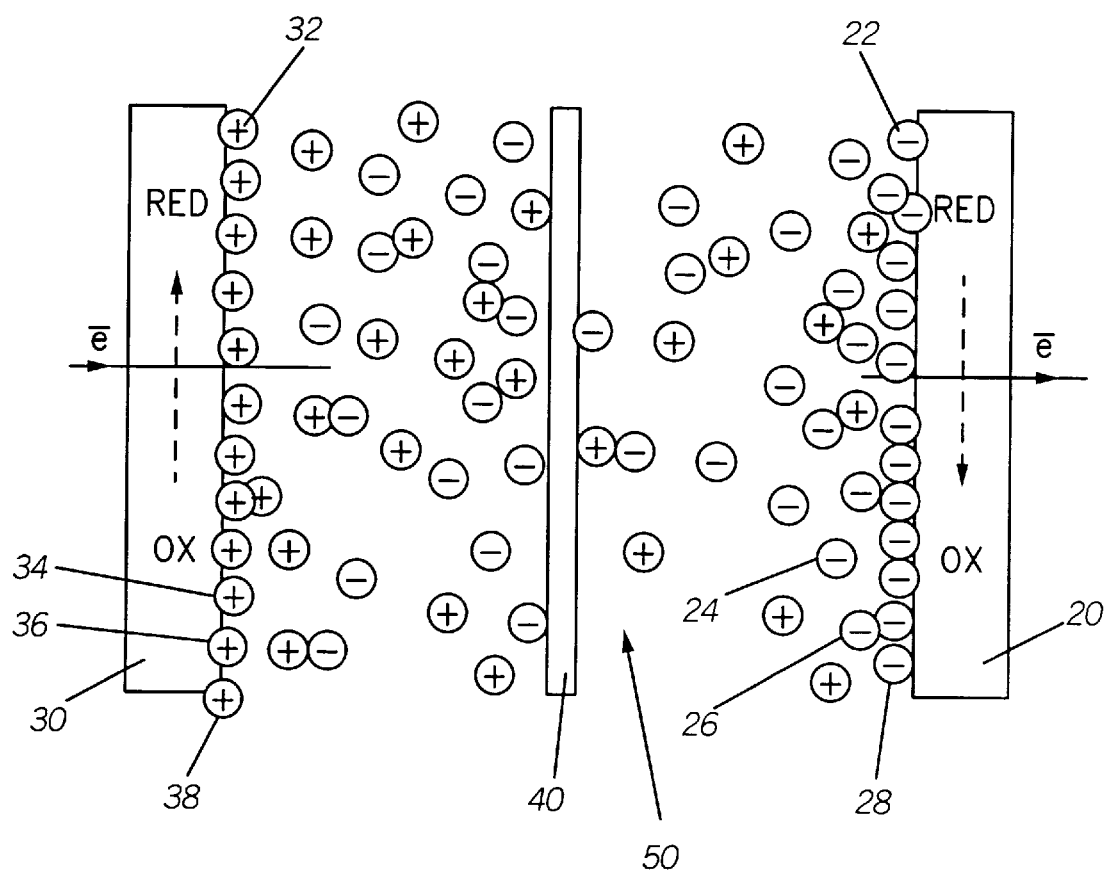
FIG. 1 is a schematic representation of a high-energy density pseudocapacitor in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a schematic representation of a high energy density electrochemical capacitor device 10 in accordance with the instant invention. The device 10 includes electrodes 20, 30 and a separator 40 operatively disposed therebetween. Also disposed between the electrodes, 20 30 is an electrolyte 50, which as illustrated in FIG. 1, is an aqueous (liquid) electrolyte disposed entirely about both the electrodes 20, 30. It is to be understood however that while the invention is illustrated herein with an aqueous electrolyte, it may be employed with equal advantage to non-aqueous systems.

The polarity of an electrode is strictly defined since the current flow, which is opposite from the electron flow direction, is always from the positive electrode, (positively charged terminal), such as electrode 30, to the negative electrode (negatively charged terminal), such as electrode 20. In an electrochemical cell, such as cell 10, the polarities of the electrodes do not change during the charging and discharging processes. Further, the polarities of the electrodes in an electrochemical cell depend on the physical and chemical properties of both electrode and electrolyte. The electrochemical process, on the other hand, does change during the charging and discharging processes since the anode process is defined for the electro-oxidation process, and the cathode process is defined for the electro-reduction process. Therefore, as used herein and according to battery industry convention, the positive electrode refers to the cathode during the discharge process, and the negative electrode refers to the anode during the discharge process. The roles are reversed during the charging process. Hereinafter, references to the "cathode" refer to the electrode serving as the cathode during discharge, i.e., the positive electrode 30. Similarly, references herein to the "anode" refer to the electrode serving as the anode during discharge, i.e., the negative electrode 20.

The cathode 30 may be fabricated from any of a number of different materials known in the art. Examples of such materials include vanadium oxides, chromium oxides, manganese oxides, iron oxides, cobalt oxides, nickel oxides or their corresponding sulfides, selenides, tellurides, and combinations thereof. In a preferred embodiment, the cathode is fabricated of a nickel-molybdenum-chromium alloy such as that described in commonly assigned, co-pending U.S. patent application Ser. No. 08/322,130 filed Oct. 13, 1994, now U.S. Pat. No. 5,429,895 the names of Ke Keryn Lian and Lijun Bai, the disclosure of which is incorporated herein by reference.

The electrolyte 50 used in connection with the electrochemical capacitor device in accordance with the invention may be any aqueous electrolyte, such as an alkaline electrolyte, a neutral electrolyte, or an acid electrolyte. In one preferred embodiment, the electrolyte is 31% KOH. Similarly the separator (40) may be fabricated of a number of known separator materials as are practiced in the art. Specific examples of such separators includes but are not limited to porous cellulose, porous silica, glass wool, glass fiber, polypropylene, and combinations thereof.

The schematic representation of the device 10 shown in FIG. 1 is used to explain the redox processes occurring at the anode 20 and the cathode 30. During charging, electrons, for example, the electrodes 22, 24, 26, 28, flow to the anode 20 as shown, and the active material from which the anode is formed undergoes a reduction process. The resulting charge imbalance, here, an excess of negative charge, is balanced by the migration of positively charged ions 32, 34, 36, 38) from the electrolyte to cathode 30 as shown.

While the reduction process occurs at the anode, a complimentary oxidation process takes place at the cathode, resulting in the ejection of an electron. Both the electrode processes occur at or near the electrode/electrolyte interface. During this process, ions pass through the porous separator 40. The entire scenario is then reversed during the discharge process of the pseudocapacitor electrodes.

In accordance with the present invention, there is provided an electrode material for use as, for example, the anode in an aqueous electrochemical capacitor. The electrode material comprises a multicomponent material having an antimony (Sb) host matrix material and at least one modifier component. The electrode material may be described by the formula:

$Sb_{1-X}M_X$ where the host matrix material is antimony (Sb); M is a modifier component which may be selected from the group of bismuth (Bi), nickel (Ni), cadmium (Cd), zinc (Zn), silver (Ag), manganese (Mn), lead (Pb), lithium (Li), silicon (Si), boron (B), phosphorus (P), carbon (C), aluminum (Al), copper (Cu), chromium (Cr), vanadium (V), titanium (Ti), molybdenum (Mo), zirconium (Zr), Tungsten (W), sulfer (S), oxygen (O), hydrogen (H), and combinations thereof; and X is between 0.0 and 0.5. Hence, Sb is present in the electrode material in ratios of between 50% and 100%. In one preferred embodiment, the modifier is Bi.

In an alternative embodiment, the electrode material may be described by the formula:

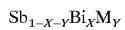

$Sb_{1-X-Y}Bi_XM_Y$ where the host matrix material is antimony (Sb); Bi is bismuth; M is a modifier component which may be selected from the group of nickel (Ni), cadmium (Cd), zinc (Zn), silver (Ag), manganese (Mn), lead (Pb), lithium (Li), silicon (Si), boron (B), phosphorus (P), carbon (C), aluminum (Al), copper (Cu), chromium (Cr), vanadium (V), titanium (Ti), molybdenum (Mo), zirconium (Zr), Tungsten (W), sulfer (S), oxygen (O), hydrogen (H), and combinations thereof; X is between 0.0 and 0.5; Y is between 0.0 and 0.5; and X+Y is less than or equal to 0.5.

A characteristic of Sb and Bi is that they share a rhombohedral crystal structure, and have similar atomic radii. As a result, they are able to form solid solutions, i.e., thermodynamically favorable, atomic scale, random arrangements of antimony and bismuth atoms around a common lattice, over the entire compositional range. Thus atomic scale solid state mixing of Sb and Bi may be employed to alter and improve the electrochemical performance of the Sb.

The invention is further discussed by offering specific examples of the electrode material.

EXAMPLES

Figure 2:
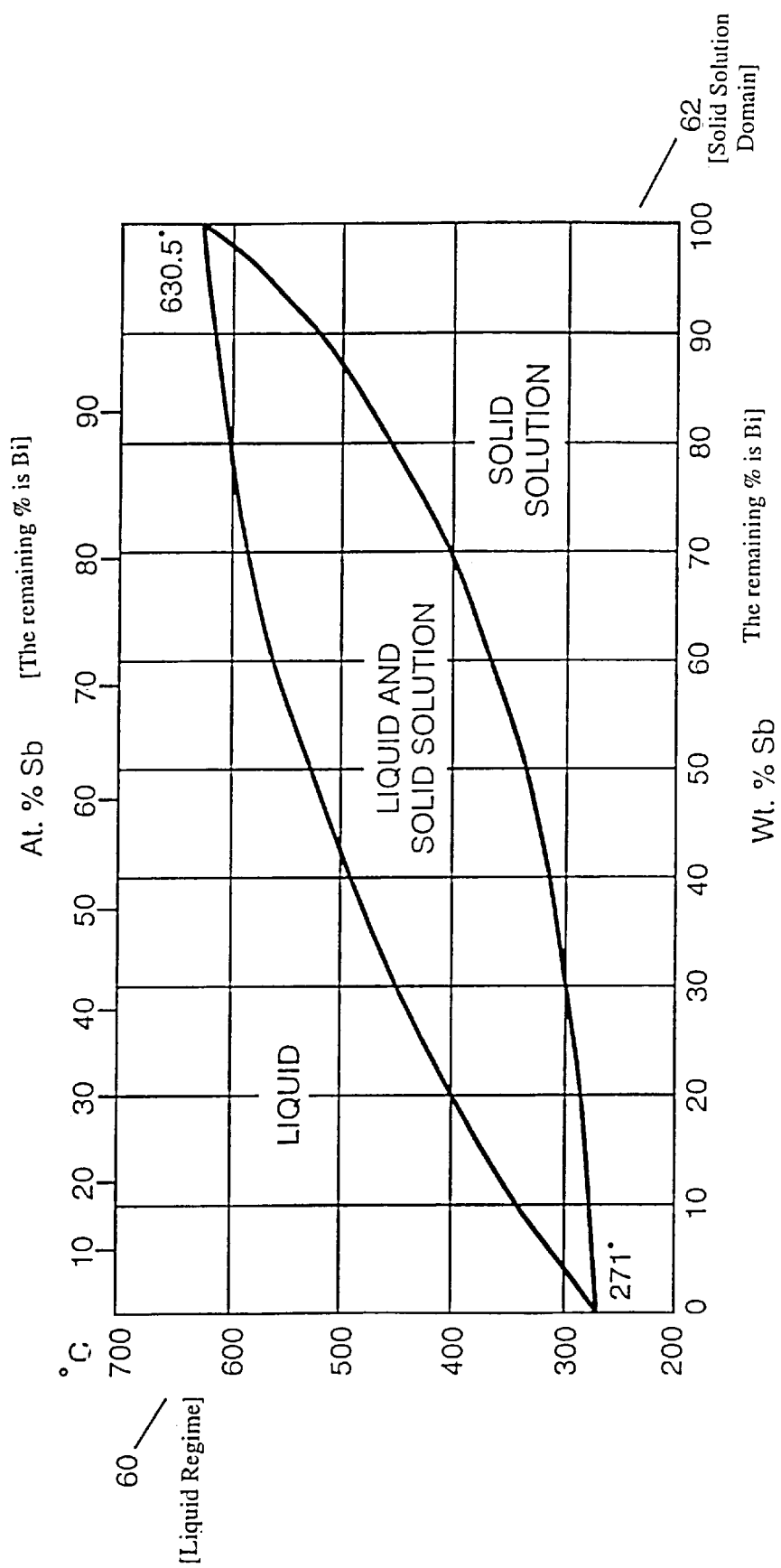
FIG. 2 is a phase diagram illustrating specific solid solution compositions that can be prepared as electrode materials, in accordance with the instant invention.

Referring now to FIG. 2, there is illustrated therein a phase diagram of specific solid solution compositions that can be prepared as electrode materials, in accordance with the instant invention. Specific solid solution compositions can be prepared by heating Sb and Bi starting materials in a reducing or inert atmosphere. Heating takes place in the liquid regime of the phase diagram of FIG. 2, illustrated by arrow 60. After heating, the material is cooled to the solid solution domain identified by arrow 62. Thus, a 10 atomic % Bi—90 atomic % Sb solid solution was prepared by heating elemental Sb and Bi above 610° C., and cooling the homogenous melt between stainless steel blocks to form a solid solution. The solid solution forms independently of cooling rate where, as here, the solid solution is thermodynamically favored. This quenching technique was employed as a simple means for forming an electrode of the thickness of between 50 and 500 μm. Casting or other metallurgical forming techniques characterized bylowering cooling rates may also be employed.

Using this formation technique, three Sb—Bi alloys were prepared: 90% Sb—10% Bi; 70% Sb—30% Bi; and 50% Sb—50% Bi. Each of the alloys, along with a pure Sb sample were formed as thin films, i.e., films having a thickness of between 50 μm and 500 μm. All experiments were carried out in a 31% KOH electrolyte at room temperature. The reference electrode was Hg/HgO in the same electrolyte, and counter electrodes were Ni screens.

Figure 3:
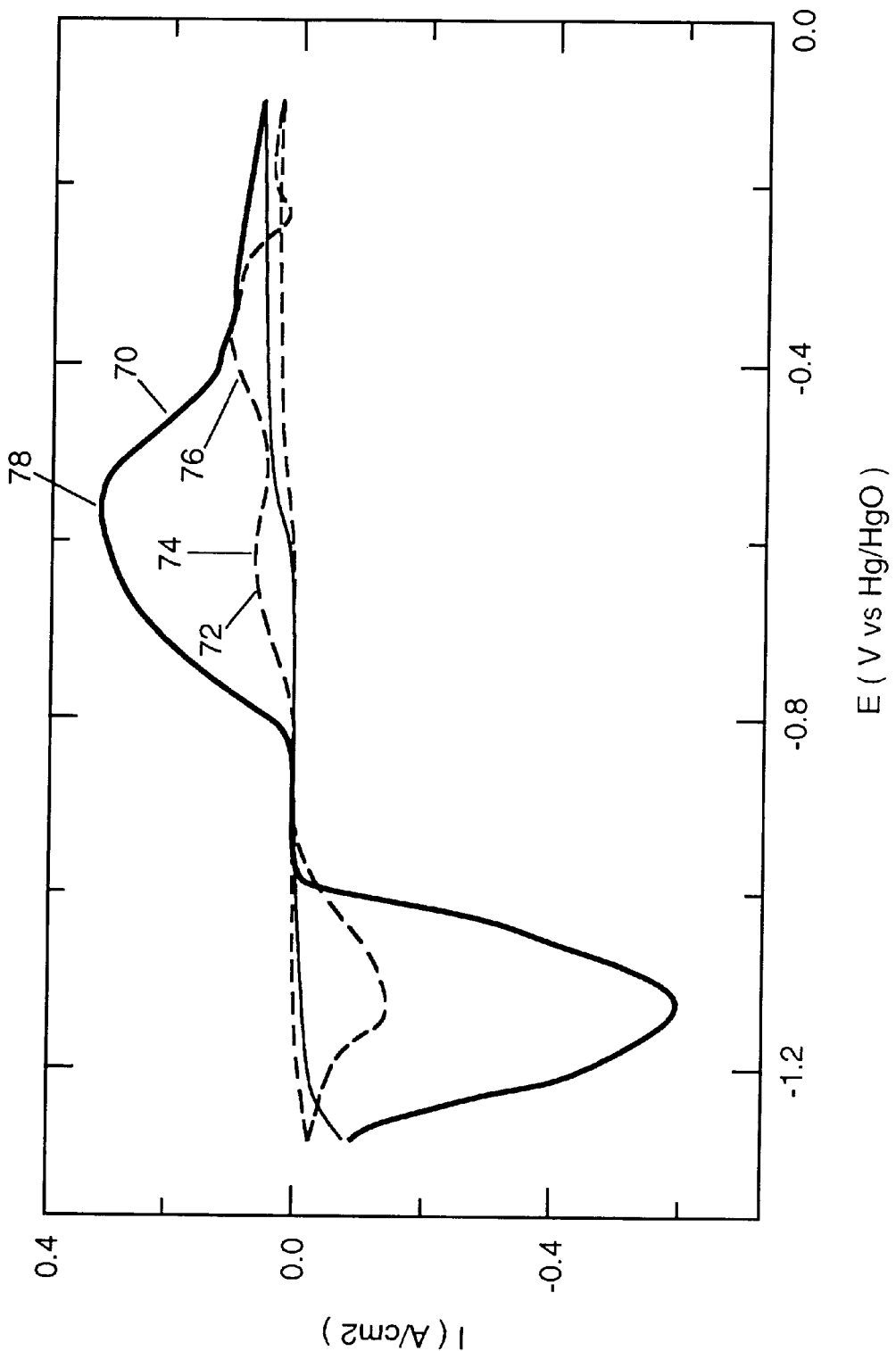
FIG. 3 is a cyclic voltammogram illustrating the performance of electrode materials in accordance with the instant invention.

Referring now to FIG. 3, there is illustrated therein the cyclic voltammogram curves obtained for the Sb(90%) Bi(10%), solid solution anode curve 70, and a 100% Sb, anode curve 72, in 30% KOH. The Sb(90%) Bi(10%) anode demonstrated much larger capacity than the pure Sb anode, by approximately 4 times, though both posses high discharge rates. Further, the pure Sb material demonstrate two anodic peaks 74 and 76, which is not desirable for capacitor performance. Also, the reaction corresponding to peak 76 was found to be due to the formation of higher oxidation state oxides of antimony (i.e., $Sb^{+5}$), and were hence irreversible. Degradation of the electrode, along with dissolution and flaking of the electrode material was also observed with cycling of the material in the potential range illustrated in FIG. 3. By contrast, the Sb(90%) Bi(10%) material demonstrated only one anodic peak 78, and no appreciable degradation of the performance or physical characteristics of the material with cycling. Further, the bismuth has a higher anodic activity in a potential range more positive than antimony. As a result, it is believed that the Bi in SbBi alloys acts as a getter for hydroxide ions, and suppresses the antimony's higher oxidation processes which are associated with the degradation processes. Thus, the solid solution incorporation of bismuth into a SbBi alloy yields an anode material having good half cell potential, excellent electrochemical rechargeability, and high capacity.

Figure 4:
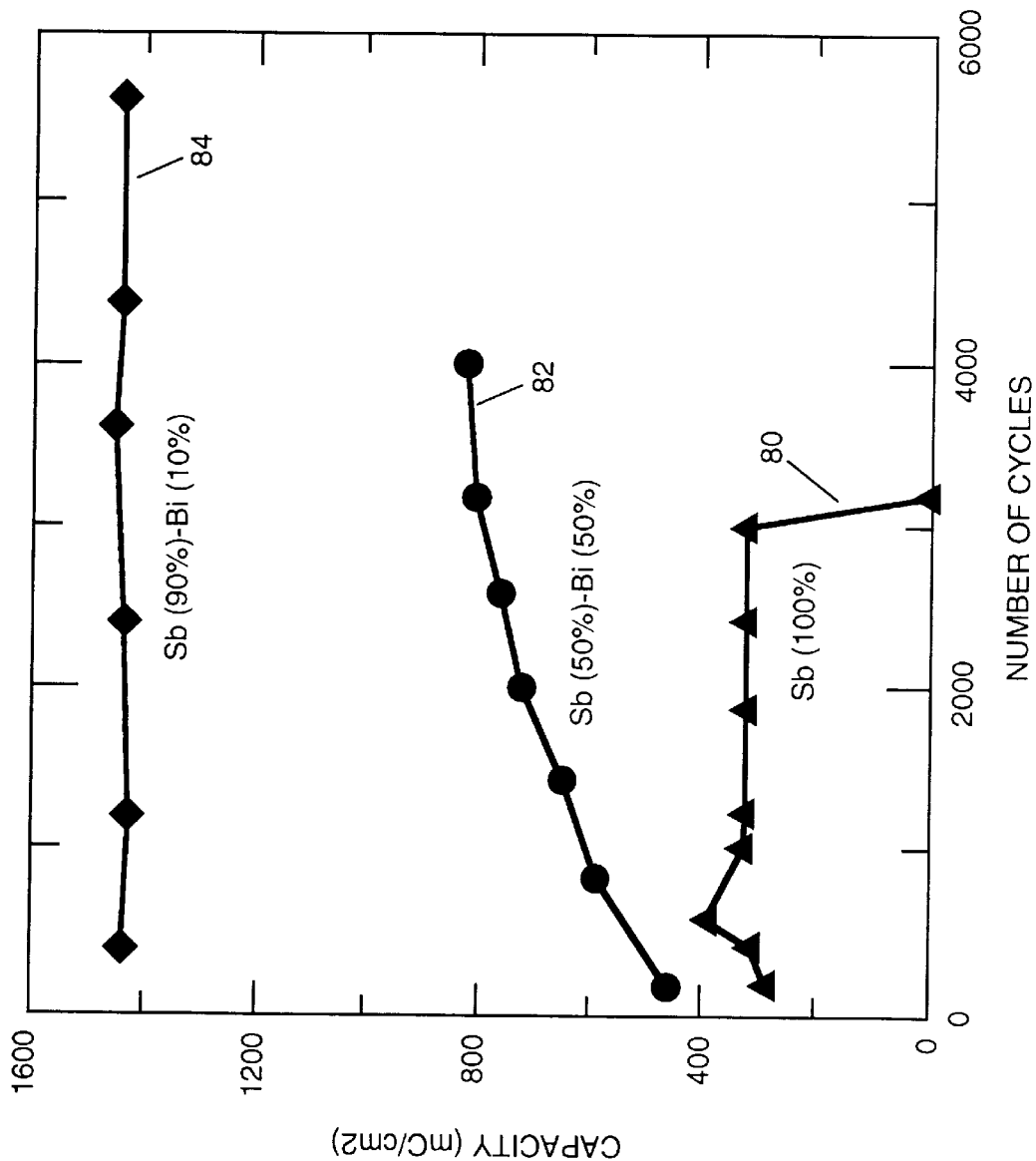
FIG. 4 is a chart illustrating life cycle performance for electrode materials in accordance with the instant invention.

Referring now to FIG. 4, there is illustrated therein the results of cycle life testing of the three Sb compositions described above. As may be appreciated from a perusal of FIG. 4, the pure Sb sample (line 80) deteriorated abruptly after approximately 3,000 cycles. This is believed attributable to the deterioration described above with respect to FIG. 3. Line 82 illustrates a Sb (50%—Bi(50%) alloy material which demonstrated the ability to hold capacity until approximately 4,000 cycles, with gently increasing capacity. Line 84 illustrates a Sb(90%) Bi(10%) solid solution alloy demonstrating very stable, high capacity output to 6,000 cycles, at which point testing was terminated.

Figure 5:
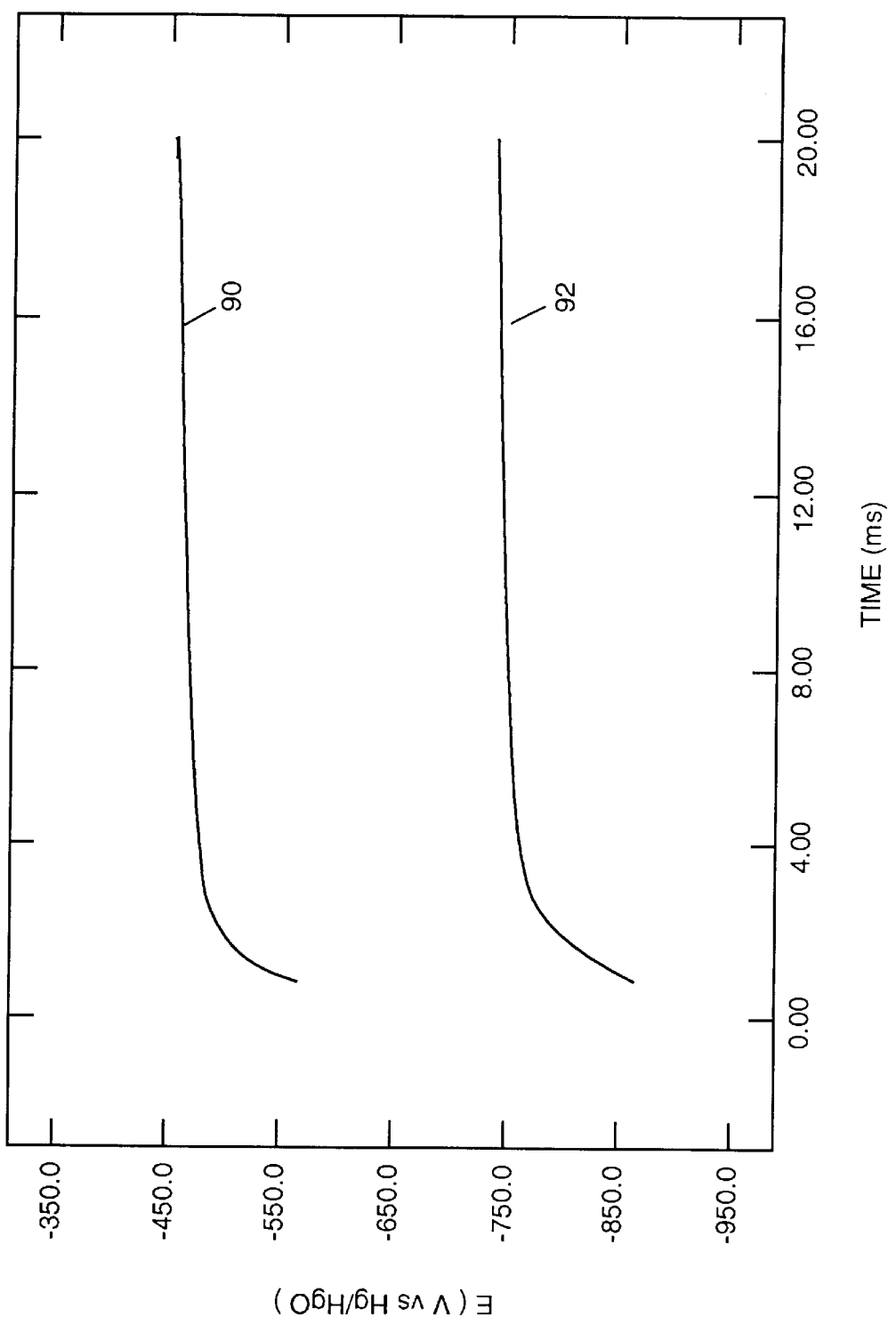
FIG. 5 is a constant current discharge curve for electrode materials in accordance with the instant invention.

Referring now to FIG. 5, there is illustrated therein a comparison of the discharge performance between Sb(90%) Bi(10%) anodes, line 90, and a pure Bi anode, line 92. At a discharge rate of 1 A/cm², the Sb—Bi alloy anode has a more negative anodic potential by about 300 mV than that of the pure bismuth anode. Thus substitution of the SbBi alloy for pure Bi results in about a 40% increase in energy density.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A negative electrode material for an electrochemical cell, said negative electrode material having the formula:

$$Sb_{1-X}M_X$$

wherein M is bismuth, and X is between 0.05 and 0.15.

2. A negative electrode material for an electrochemical cell, said electrode material having the formula:

$$Sb_{1-X-Y}Bi_XM_Y$$

wherein M is a modifier component; X is between 0.0 and 0.5; Y is between 0.0 and 0.5; and X+Y is less than or equal to 0.5;

wherein M is selected from the group consisting of bismuth, nickel, cadmium, zinc, silver, manganese, lead, lithium, silicon, boron, phosphorus, carbon, aluminum, copper, chromium, vanadium, titanium, molybdenum, zirconium, tungsten, sulfur, oxygen, hydrogen, and combinations thereof.

3. An electrochemical cell comprising:

a first electrode, including a negative electroactive material having the formula:

$$Sb_{1-X}M_X$$

wherein M is a modifier component, and X is between 0.0 and 0.5; and a second electrode fabricated of a nickel-molybdenum-chromium alloy material;

wherein M is selected from the group consisting of bismuth, nickel, cadmium, zinc, silver, manganese, lead, lithium, silicon, boron, phosphorus, carbon, aluminum, copper, chromium, vanadium, titanium, molybdenum, zirconium, tungsten, sulfur, oxygen, hydrogen, and combinations thereof.

4. The electrochemical cell as in claim 3, wherein said first electrode is the anode of said cell.

5. The electrochemical cell as in claim 3, wherein said second electrode is the cathode of said cell.

6. The electrochemical cell as in claim 3, wherein M is bismuth.

7. The electrochemical cell as in claim 6, wherein X is between 0.05 and 0.15.

8. The electrochemical cell as in claim 3, wherein said electrochemical cell is a battery.

* * * * *

UNITED STATES PATENT AND TRADEMARK OFFICE
CERTIFICATE OF CORRECTION

PATENT NO. : 6,130,004
DATED : October 10, 2000
INVENTOR(S) : Li, et al.

Page 1 of 1

It is certified that error appears in the above-identified patent and that said Letters Patent is hereby corrected as shown below:

Attorney, Agent or Firm column reads "Borrus" should be --Burrus--.

Signed and Sealed this

Seventeenth Day of July, 2001

Attest:

NICHOLAS P. GODICI
Attesting Officer
Acting Director of the United States Patent and Trademark Office